United States Patent
Tripathi et al.

(10) Patent No.: US 10,417,723 B2
(45) Date of Patent: Sep. 17, 2019

(54) METHOD AND SYSTEM FOR IDENTIFYING LOCATIONS FOR PLACEMENT OF REPLENISHMENT STATIONS FOR VEHICLES

(71) Applicant: Conduent Business Services, LLC, Florham Park, NJ (US)

(72) Inventors: Abhishek Tripathi, Bangalore (IN); Skanda Vasudevan, Chittoor (IN); Alefiya Lightwala, Indore (IN); Arpita Biswas, Kolkata (IN); Partha Dutta, Bangalore (IN)

(73) Assignee: Conduent Business Services, LLC, Florham Park, NJ (US)

( * ) Notice: Subject to any disclaimer, the term of this patent is extended or adjusted under 35 U.S.C. 154(b) by 661 days.

(21) Appl. No.: 15/017,722

(22) Filed: Feb. 8, 2016

(65) Prior Publication Data
US 2017/0228840 A1 Aug. 10, 2017

(51) Int. Cl.
G06Q 50/16 (2012.01)
G06Q 30/02 (2012.01)
G06Q 50/06 (2012.01)

(52) U.S. Cl.
CPC ....... *G06Q 50/165* (2013.01); *G06Q 30/0201* (2013.01); *G06Q 30/0202* (2013.01); *G06Q 50/06* (2013.01)

(58) Field of Classification Search
None
See application file for complete search history.

(56) References Cited

U.S. PATENT DOCUMENTS

| | | | | | |
|---|---|---|---|---|---|
| 4,885,690 | A | * | 12/1989 | Schimmel | B60R 16/0236 701/54 |
| 5,987,383 | A | * | 11/1999 | Keller | A01B 69/007 342/357.36 |
| H001845 | H | * | 3/2000 | Kelly | 701/50 |

(Continued)

OTHER PUBLICATIONS

Klami, Arto, Seppo Virtanen, and Samuel Kaski. "Bayesian canonical correlation analysis." *The Journal of Machine Learning Research* 14.1 (2013): 965-1003.

(Continued)

*Primary Examiner* — Leland Marcus
(74) *Attorney, Agent, or Firm* — Jones Robb, PLLC

(57) ABSTRACT

A method and a system are provided for identifying one or more locations for placement of one or more replenishment stations for one or more vehicles. The method comprises receiving a historical demand data at a plurality of existing replenishment stations within a pre-defined area. The method identifies one or more point of interest locations within the pre-defined area based on a map data. Further, the method receives traffic information between a plurality of road intersections within the pre-defined area. Based on an aggregation of a first demand prediction, a second demand prediction, and a third demand prediction, the method predicts a replenishment demand at a plurality of locations. The method further identifies the one or more locations from the plurality of locations for placement of the one or more replenishment stations based on the predicted replenishment demand at the plurality of locations and a pre-defined threshold.

19 Claims, 7 Drawing Sheets

(56) References Cited

U.S. PATENT DOCUMENTS

| | | | | |
|---|---|---|---|---|
| 6,128,574 | A * | 10/2000 | Diekhans | A01B 79/005 |
| | | | | 701/410 |
| 8,234,150 | B1 * | 7/2012 | Pickton | G06Q 10/101 |
| | | | | 705/7.31 |
| 8,766,595 | B2 | 7/2014 | Gaul et al. | |
| 2004/0138938 | A1 * | 7/2004 | Quintus | G06Q 10/06 |
| | | | | 705/7.25 |
| 2004/0193348 | A1 * | 9/2004 | Gray | A01B 69/008 |
| | | | | 701/50 |
| 2005/0033454 | A1 * | 2/2005 | Fitzner | A01D 41/127 |
| | | | | 700/11 |
| 2005/0273253 | A1 * | 12/2005 | Diekhans | G01C 21/20 |
| | | | | 701/50 |
| 2009/0018813 | A1 * | 1/2009 | Kothari | G06Q 10/04 |
| | | | | 703/22 |
| 2010/0152943 | A1 * | 6/2010 | Matthews | A01B 69/003 |
| | | | | 701/25 |
| 2010/0262450 | A1 * | 10/2010 | Kalish | G06Q 10/06315 |
| | | | | 705/7.25 |
| 2010/0292877 | A1 * | 11/2010 | Lee | B60K 1/04 |
| | | | | 701/21 |
| 2011/0137470 | A1 * | 6/2011 | Surnilla | G01C 21/26 |
| | | | | 700/282 |
| 2012/0209512 | A1 * | 8/2012 | Kujirai | G01C 21/3423 |
| | | | | 701/428 |
| 2012/0316904 | A1 * | 12/2012 | Eder | G06Q 10/06 |
| | | | | 705/7.11 |
| 2013/0091452 | A1 * | 4/2013 | Sorden | G06F 3/048 |
| | | | | 715/771 |
| 2013/0222158 | A1 | 8/2013 | Dai et al. | |
| 2014/0214480 | A1 * | 7/2014 | Jamal | G06Q 30/0201 |
| | | | | 705/7.29 |
| 2014/0257911 | A1 * | 9/2014 | Anderson | G06Q 10/06315 |
| | | | | 705/7.25 |
| 2015/0051949 | A1 * | 2/2015 | Pickton | G06Q 30/0202 |
| | | | | 705/7.31 |
| 2017/0094058 | A1 * | 3/2017 | Piaggio | H04M 3/5191 |

OTHER PUBLICATIONS

Hardoon, David, Sandor Szedmak, and John Shawe-Taylor. "Canonical correlation analysis: An overview with application to learning methods." *Neural computation* 16.12 (2004): 2639-2664.

Kakade, Sham M., and Dean P. Foster. "Multi-view regression via canonical correlation analysis." *Learning Theory*. Springer Berlin Heidelberg, 2007. 82-96.

Chen, T. Donna, Kara M. Kockelman, and Moby Khan. "The electric vehicle charging station location problem: a parking-based assignment method for Seattle." *Transportation Research Board 92nd Annual Meeting*. vol. 340. 2013.

* cited by examiner

METHOD AND SYSTEM FOR IDENTIFYING LOCATIONS FOR PLACEMENT OF REPLENISHMENT STATIONS FOR VEHICLES

TECHNICAL FIELD

The presently disclosed embodiments are related, in general, to transportation systems. More particularly, the presently disclosed embodiments are related to method and system for identifying one or more locations for placement of one or more replenishment stations for one or more vehicles.

BACKGROUND

Advancements in the field of planning for the purpose of setting up a transport infrastructure have helped to predict a replenishment demand at a plurality of locations. Replenishment demand may correspond to a measure of requirement of fuel to run vehicles. Fuel may correspond to electricity, gasoline, diesel, etc.

With advent and development of electric vehicles, there is need to have electric vehicle charging infrastructure. As the technology is still being adopted, the electric vehicle charging infrastructure are very few, and sparsely located in an area. Further, such electric vehicle charging stations may be placed at locations that may be selected on an ad hoc basis. The placement of electric vehicle charging stations on ad hoc basis may lead to improper utilization of the electric vehicle charging infrastructure. Thus, such locations may not be suited for a proper electric vehicle charging infrastructure that meets the electric vehicle charging needs.

Further limitations and disadvantages of conventional and traditional approaches will become apparent to those skilled in the art, through a comparison of described systems with some aspects of the present disclosure, as set forth in the remainder of the present application and with reference to the drawings.

SUMMARY

According to embodiments illustrated herein, there may be provided a method for identifying one or more locations for placement of one or more replenishment stations for one or more vehicles. The method may utilize one or more processors to receive a historical demand data at a plurality of existing replenishment stations within a pre-defined area. The method may further identify one or more point of interest locations within the pre-defined area based on a map data. The method may further received traffic information between a plurality of road intersections within the pre-defined area, from one or more sensors. The method may create a first replenishment prediction model, a second replenishment prediction model, and a third replenishment prediction model based on a combination of the historical demand data and the historical demand data of one or more existing replenishment stations near each of the plurality of existing replenishment stations, the historical demand data and the one or more point of interest locations, and the historical demand data and the traffic information, respectively. The method further determine a first demand prediction, a second demand prediction, and a third demand prediction based on the first replenishment prediction model, the second replenishment prediction model, and the third replenishment prediction model, respectively. The method may predict a replenishment demand at a plurality of locations within the pre-defined area based on an aggregation of the first demand prediction, the second demand prediction, and the third demand prediction. The method may further identify the one or more locations from the plurality of locations for placement of the one or more replenishment stations based on the predicted replenishment demand at the plurality of locations and a pre-defined threshold.

According to embodiments illustrated herein, there may be provided a system that comprises an application server configured to identify one or more locations for placement of one or more replenishment stations for one or more vehicles. The application server may further comprise one or more processors configured to receive a historical demand data at a plurality of replenishment stations that are located within a pre-defined area. The application server may identify one or more point of interest locations within the pre-defined area based on a map data. The application server may further receive traffic information between a plurality of road intersections within the pre-defined area, from one or more sensors. The application server may create a first replenishment prediction model, a second replenishment prediction model, and a third replenishment prediction model based on a combination of the historical demand data and the historical demand data of one or more existing replenishment stations near each of the plurality of existing replenishment stations, the historical demand data and the one or more point of interest locations, and the historical demand data and the traffic information, respectively. The application server may further determine a first demand prediction, a second demand prediction, and a third demand prediction based on the first replenishment prediction model, the second replenishment prediction model, and the third replenishment prediction model, respectively. The application server may further predict a replenishment demand at a plurality of locations within the pre-defined area based on an aggregation of the first demand prediction, the second demand prediction, and the third demand prediction. The application server may further identify the one or more locations from the plurality of locations for placement of the one or more replenishment stations based on the predicted replenishment demand at the plurality of locations and a pre-defined threshold.

According to embodiments illustrated herein, a non-transitory computer-readable storage medium having stored thereon, a set of computer-executable instructions for causing a computer comprising one or more processors to perform steps of receiving, by one or more processors, a historical demand data at a plurality of replenishment stations that are located within a pre-defined area. The one or more processors may identify one or more point of interest locations within the pre-defined area based on a map data. The one or more processors may receive traffic information between a plurality of road intersections within the pre-defined area, from one or more sensors. The one or more processors may create a first replenishment prediction model, a second replenishment prediction model, and a third replenishment prediction model based on a combination of the historical demand data and the historical demand data of one or more existing replenishment stations near each of the plurality of existing replenishment stations, the historical demand data and the one or more point of interest locations, and the historical demand data and the traffic information, respectively. The one or more processors may further determine a first demand prediction, a second demand prediction, and a third demand prediction based on the first replenishment prediction model, the second replenishment prediction model, and the third replenishment prediction model, respectively. The one or more processors may predict a replenishment demand at a plurality of locations within the pre-defined area based on an aggregation of the first demand prediction, the second demand prediction, and the third demand prediction. The one or more processors may identify one or more locations from the plurality of locations for placement of one or more replenishment stations based on the predicted replenishment demand at the plurality of locations and a pre-defined threshold.

BRIEF DESCRIPTION OF DRAWINGS

The accompanying drawings illustrate the various embodiments of systems, methods, and other aspects of the disclosure. Any person with ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Further, the elements may not be drawn to scale.

Various embodiments will hereinafter be described in accordance with the appended drawings, which are provided to illustrate and not limit the scope in any manner, wherein similar designations denote similar elements, and in which.

DETAILED DESCRIPTION

Figure 1:
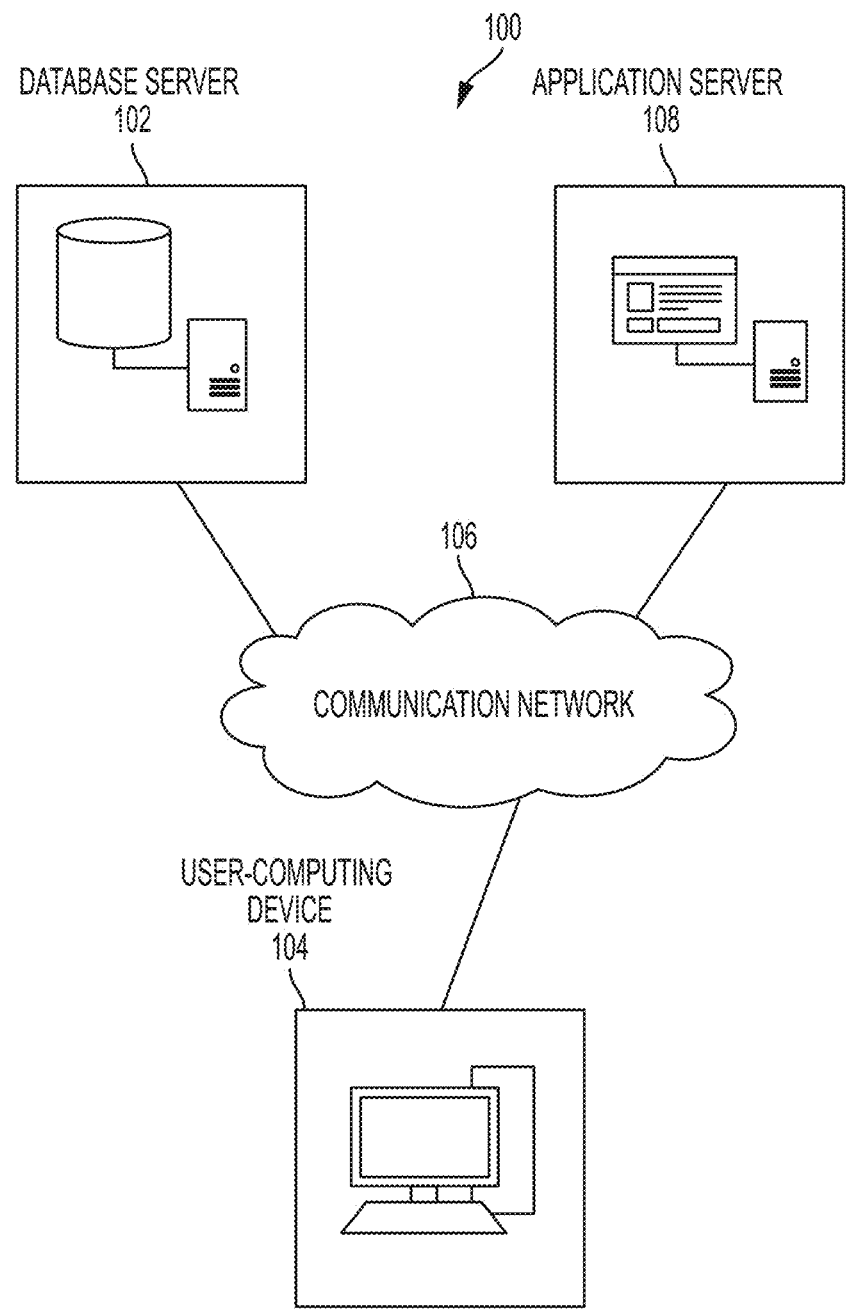
FIG. 1 is a block diagram that illustrates a system environment in which various embodiments of a method and a system may be implemented.

The present disclosure may be best understood with reference to the detailed figures and description set forth herein. Various embodiments are discussed below with reference to the figures. However, those skilled in the art will readily appreciate that the detailed descriptions given herein with respect to the figures are simply for explanatory purposes, as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on indicate that the embodiment(s) or example(s) may include a particular feature, structure, characteristic, property, element, or limitation but that not every embodiment or example necessarily includes that particular feature, structure, characteristic, property, element, or limitation. Further, repeated use of the phrase "in an embodiment" does not necessarily refer to the same embodiment.

Definitions: The following terms shall have, for the purposes of this application, the respective meanings set forth below.

A "plurality of locations" refers to one or more geographic coordinates in a predefined area. In an embodiment, each of the plurality of locations may be represented by latitude and longitude coordinates. In an embodiment, one or more locations from the plurality of locations refer to the locations at which one or more replenishment stations are placed for refueling one or more vehicles.

A "plurality of existing replenishment stations" refers to refueling stations that are currently functional and being utilized to refuel one or more vehicles. In an embodiment, the plurality of existing replenishment stations corresponds to a gas station or an electric vehicle charging station.

"One or more replenishment stations" refers to refueling stations that will be placed at one or more locations based on a replenishment demand at each of the one or more locations. In an embodiment, the one or more replenishment stations corresponds to a gas station or an electric vehicle charging station. In an embodiment, the one or more replenishment stations are different from a plurality of existing replenishment stations.

A "historical demand data" refers to a demand at an existing replenishment station from a plurality of existing replenishment stations. In an embodiment, the historical demand data comprises a number of charge units consumed per hour by the existing replenishment station.

"One or more point of interest locations" refers to a place that is of interest to a user. For example, a point of interest location is a shop, a restaurant, a hospital, or a hotel. In an embodiment, each of the one or more point of interest locations have an address (e.g. street address) associated with them. In an embodiment, the one or more point of interest locations are classified into one or more categories. In an embodiment, the one or more categories comprise sustenance, education, transportation, financial, healthcare, entertainment, sports, gardens, place of worships, shops, and public buildings. In an embodiment, the one or more point of interest locations are determined based on a number of visits by one or more vehicles at each of the one or more point of interest locations. In an embodiment, the one or more point of interest locations are displayed on a virtual map displayed on a display screen. Further, in an embodiment, an online map service can geocode each of the one or more point of interest locations. In an embodiment, the online map service determines the latitude and longitude coordinates of the address of the one or more point of interest locations. An exemplary technique of geocoding is address interpolation.

"Traffic information" refers to information about traffic speeds, traffic density, and travel times between a plurality of road intersections within a pre-defined area. In an embodiment, a positioning system (e.g., a GPS system) in conjunction with one or more sensors is utilized to determine the traffic information. In an embodiment, a GPS device and an accelerometer fitted inside each of a plurality of vehicles is utilized to determine the traffic information. In an embodiment, such traffic information is provided to businesses providing a traffic service (i.e., B2B) and/or consumers using various traffic enabled devices, such as a navigation system (i.e., B2C). For example, a traffic data supplier may provide the traffic information in the form of one or more data feeds, such as an RSS or XML feed.

"One or more sensors" refers to a device that detects/measures events or changes in quantities and provides a corresponding output, generally as an electrical or optical signal. In an embodiment, the one or more sensors correspond to devices that are utilized to determine a traffic information between a plurality of road intersections within a pre-defined area. Examples of the one or more sensors comprise but are not limited to an accelerometer, a motion sensor, an infrared sensor, and the like.

A "first demand prediction" corresponds to a demand predicted at a plurality of locations based on a historical demand data. In an embodiment, the first demand prediction is determined using a canonical correlation analysis based on the combination of the historical demand data and a first latent variable.

A "second demand prediction" corresponds to a demand predicted at a plurality of locations based on one or more point of interest locations. In an embodiment, the second demand prediction is determined using a canonical correlation analysis based on a combination of the one or more point of interest locations and a second latent variable.

A "third demand prediction" corresponds to a demand predicted at a plurality of locations based on a traffic information. In an embodiment, the third demand prediction is determined using a canonical correlation analysis based on a combination of the traffic information and a third latent variable.

A "latent variable" is a variable that is not directly observed but is rather inferred (through a mathematical model) from other variables that are observed (directly measured) using one or more sensors.

A "replenishment demand" corresponds to a demand predicted at a plurality of locations based on an aggregation of a first demand prediction, a second demand prediction, and a third demand prediction. In an embodiment, the replenishment demand represents a number of charge units consumed per hour at the plurality of locations.

"One or more input parameters" refers to information received by a user that will be utilized to identify one or more locations from a plurality of locations for placement of the one or more replenishment stations based on a predicted replenishment demand at the plurality of locations and a pre-defined threshold. In an embodiment, the user may select/input the one or more input parameters using a user-interface. In an embodiment, the one or more input parameters correspond to a pre-defined area, information pertaining to the plurality of locations, and a time interval for which the replenishment demand at the plurality of locations is to be predicted.

"One or more user interactive markers" refers to one or more user interface elements that are representative of a plurality of existing replenishment stations and/or one or more replenishment stations that will be placed at one or more locations. In an embodiment, a user performs an input operation, such as a mouse click on a user interactive marker to get further information associated with the plurality of existing replenishment stations and/or the one or more replenishment stations. In an embodiment, the information may comprise a replenishment demand at a corresponding replenishment station is displayed when the user performs the input operation. For example, when a user clicks on an interactive marker, then the number of charge units consumed at the location specified by the interactive marker is displayed.

"Canonical correlation analysis (CCA)" refers to a method that is used to determine a correlation between cross-covariance matrices. If we have two vectors $X=(X_1, \ldots, X_n)$ and $Y=(Y_1, \ldots, Y_m)$ of random variables, and there are correlations among the variables, then canonical-correlation analysis will find linear combinations of the $X_i$ and $Y_j$ which have maximum correlation with each other.

A "weight" is associated with each of a first demand prediction, a second demand prediction, and a third demand prediction. In an embodiment, the weight is assigned based on a prediction error obtained during training based on a training data. In an embodiment, the weight signifies an importance of each of the first demand prediction, the second demand prediction, and the third demand prediction in predicting a replenishment demand.

FIG. 1 is a block diagram that illustrates a system environment 100 in which various embodiments of a method and a system may be implemented. The system environment 100 may include a database server 102, a user-computing device 104, a communication network 106, and an application server 108. The database server 102, the user-computing device 104, and the application server 108 may be communicatively coupled with each other via the communication network 106. In an embodiment, the application server 108 may communicate with the database server 102 using one or more protocols such as, but are not limited to, Open Database Connectivity (ODBC) protocol and Java Database Connectivity (JDBC) protocol. In an embodiment, the user-computing device 104 may communicate with the application server 108 via the communication network 106.

In an embodiment, the database server 102 may refer to a computing device that may be configured to store a historical demand data, a location (e.g., geographical coordinates) of a plurality of existing replenishment stations, a location (e.g., geographical coordinates) of one or more point of interest locations. In an embodiment, the database server 102 may be configured to store traffic information received from one or more sensors. In an embodiment, the database server 102 may include a special purpose operating system specifically configured to perform one or more database operations on the historical demand data, the location corresponding to the one or more point of interest locations, and the location corresponding to the plurality of existing replenishment stations. Examples of the one or more database operations may include, but are not limited to, Select, Insert, Update, and Delete. In an embodiment, the database server 102 may include hardware and/or software that may be configured to perform the one or more database operations. In an embodiment, the database server 102 may be realized through various technologies such as, but not limited to, Microsoft® SQL Server, Oracle®, IBM DB2®, Microsoft Access®, PostgreSQL®, MySQL® and SQLite®, and the like.

In an embodiment, the database server 102 may be configured to receive a query from the application server 108 to retrieve the historical demand data, the location corresponding to the one or more point of interest locations, and the location corresponding to the plurality of existing replenishment stations. Thereafter, the database server 102 may be configured to transmit information pertaining to the query to the application server 108 for identifying the one or more locations for placement of the one or more replenishment stations for the one or more vehicles, via the communication network 106.

A person with ordinary skill in the art will understand that the scope of the disclosure is not limited to the database server 102 as a separate entity. In an embodiment, the functionalities of the database server 102 may be integrated into the application server 108, and vice versa.

In an embodiment, the user-computing device 104 may refer to a computing device used by a user. The user-computing device 104 may comprise one or more processors and one or more memories. The one or more memories may include a computer readable code that may be executable by the one or more processors to perform predetermined operations. In an embodiment, the user of the user-computing device 104 may provide an input to define a pre-defined area and a time interval for which the replenishment demand in the predefined area is to be predicted. In an embodiment, the user-computing device 104 may receive information pertaining to the predicted replenishment demand in the pre-defined area. An example user-interface presented on the user-computing device 104 may include a map that may allow the user to place an interactive marker at a location in the predefined area for which the user wants to know about the predicted replenishment demand. Examples of the user-computing device 104 may include, but are not limited to, a personal computer, a laptop, a personal digital assistant (PDA), a mobile device, a tablet, or any other computing device.

In an embodiment, the communication network 106 may correspond to a communication medium through which the database server 102, the application server 108, and the user-computing device 104 may communicate with each other. Such a communication may be performed in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G cellular communication protocols, and/or Bluetooth (BT) communication protocols. The communication network 106 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an embodiment, the application server 108 may refer to a computing device or a software framework hosting an application or a software service. In an embodiment, the application server 108 may be implemented to execute procedures such as, but not limited to, programs, routines, or scripts stored in one or more memories for supporting the hosted application or the software service. In an embodiment, the hosted application or the software service may be configured to perform one or more predetermined operations. In an embodiment, the application server 108 may receive information pertaining to the pre-defined area and the time interval for which the replenishment demand in the predefined area is to be predicted, from the user-computing device 104. In an embodiment, the application server 108 may be configured to transmit a query (created based on the received information pertaining to the predefined area and the time interval) to the database server 102 to retrieve the historical demand data in the predefined area, the location corresponding to the one or more point of interest locations in the predefined area, and the location corresponding to the plurality of existing replenishment stations in the predefined area. The application server 108 may be realized through various types of application servers such as, but are not limited to, a Java application server, a .NET framework application server, a Base4 application server, a PHP framework application server, or any other application server framework.

In an embodiment, the application server 108 may be configured to determine a first demand prediction, a second demand prediction, and a third demand prediction based on the historical demand data in the predefined area, the location corresponding to the one or more point of interest locations in the predefined area, and the location corresponding to the plurality of existing replenishment stations in the predefined area. Further, the application server 108 may be configured to predict a replenishment demand at a plurality of locations within the pre-defined area based on an aggregation of the first demand prediction, the second demand prediction, and the third demand prediction. In an embodiment, the application server 108 may be configured to assign a weight to each of the first demand prediction, the second demand prediction, and the third demand prediction. Further, the application server 108 may be configured to identify the one or more locations from the plurality of locations in the predefined area for placement of the one or more replenishment stations based on the predicted replenishment demand. In an embodiment, the application server 108 may transmit information pertaining to the identified one or more locations to a user-computing device 104. The operation of the application server 108 has been discussed later in conjunction with FIG. 2.

A person having ordinary skill in the art will appreciate that the scope of the disclosure is not limited to realizing the application server 108 and the user-computing device 104 as separate entities. In an embodiment, the application server 108 may be realized as an application program installed on and/or running on the user-computing device 104 without departing from the scope of the disclosure.

Figure 2:
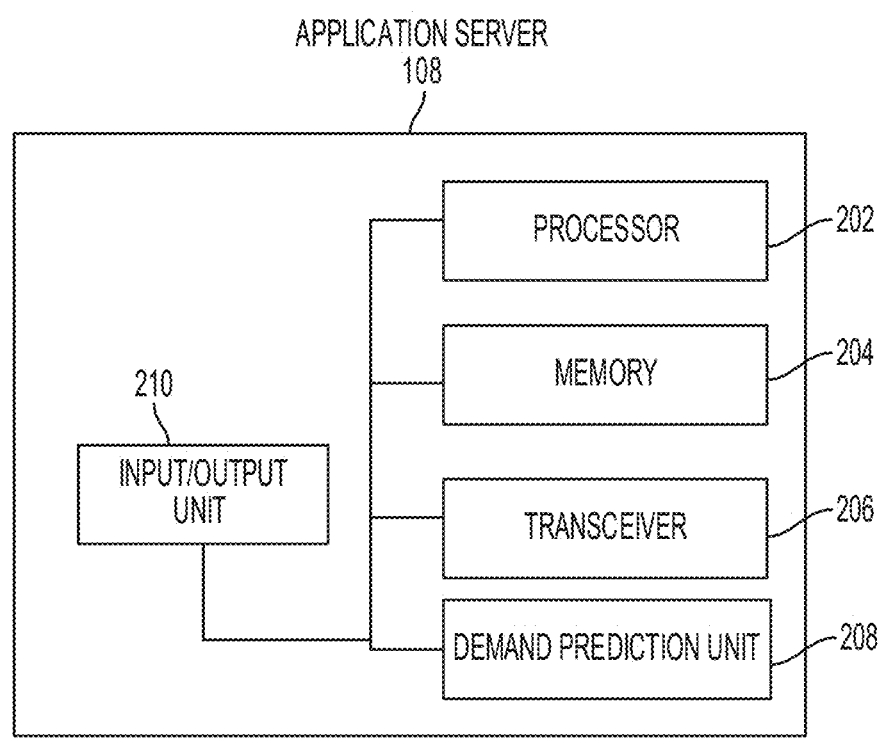
FIG. 2 is a block diagram that illustrates an application server configured to identify one or more locations for placement of one or more replenishment stations for one or more vehicles in accordance with at least one embodiment.

FIG. 2 is a block diagram that illustrates the application server 108 configured to identify the one or more locations for placement of the one or more replenishment stations for the one or more vehicles in accordance with at least one embodiment. FIG. 2 is explained in conjunction with the elements from FIG. 1. In an embodiment, the application server 108 includes a processor 202, a memory 204, a transceiver 206, a demand prediction unit 208, and an input/output unit 210. The processor 202 may be communicatively coupled to the memory 204, the transceiver 206, the demand prediction unit 208, and the input/output unit 210. The transceiver 206 may be communicatively coupled to the communication network 106.

The processor 202 comprises suitable logic, circuitry, interfaces, and/or code that may be configured to execute a set of instructions stored in the memory 204. The processor 202 may be implemented based on a number of processor technologies known in the art. The processor 202 may work in coordination with the transceiver 206, the demand prediction unit 208, and the input/output unit 210, to identify the one or more locations for placement of the one or more replenishment stations for one or more vehicles. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The memory 204 comprises suitable logic, circuitry, interfaces, and/or code that may be configured to store the set of instructions, which are executed by the processor 202. In an embodiment, the memory 204 may be configured to store one or more programs, routines, or scripts that may be executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 comprises suitable logic, circuitry, interfaces, and/or code that may be configured to receive the historical demand data at the plurality of existing replenishment stations within a pre-defined area, the one or more point of interest locations within the pre-defined area, and the traffic information between a plurality of road intersections within the pre-defined area from the database server 102, via the communication network 106. The transceiver 206 may be further configured to transmit the user-interface to the user-computing device 104, via the communication network 106. The transceiver 206 may implement one or more known technologies to support wired or wireless communication with the communication network 106. In an embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The demand prediction unit 208 comprises suitable logic, circuitry, interfaces, and/or code that may be configured to determine the first demand prediction, the second demand prediction, and the third demand prediction. In an embodiment, the demand prediction unit 208 may be implemented as an Application-Specific Integrated Circuit (ASIC) microchip designed for a special application, such as to assign weights to each of the first demand prediction, the second demand prediction, and the third demand prediction. In an embodiment, demand prediction unit 208 is configured to implement a canonical correlation analysis (CCA) technique to determine the first demand prediction, the second demand prediction, and the third demand prediction.

The input/output unit 210 comprises suitable logic, circuitry, interfaces, and/or code that may be configured to receive an input or transmit an output to the user-computing device 104. The input/output unit 210 comprises various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker.

In operation, the processor 202 works in coordination with the demand prediction unit 208 to identify the one or more locations for placement of the one or more replenishment stations for one or more vehicles.

In an embodiment, the demand prediction unit 208 may receive one or more input parameters from the user-computing device 104 via the transceiver 206. In an embodiment, the one or more input parameters may comprise the pre-defined area, the information pertaining to the plurality of locations, and a time interval for which the replenishment demand at the plurality of locations is to be predicted. For example, the user may provide input that he/she may want the predicted replenishment demand for the one or more vehicles in Rochester. Based on the received one or more input parameters, the demand prediction unit 208 may be configured to generate the query based on the one or more input parameters to retrieve the historical demand data from the database server 102.

In an embodiment, the historical demand data includes the number of charge units consumed per hour at each of the plurality of existing replenishment stations in the predefined area. The plurality of existing replenishment stations may transmit the demand data periodically to the database server 102. In an embodiment, the demand prediction unit 208 may store the historical demand data in a first data structure, for example, a matrix. For example, the predefined area comprises 252 replenishment stations, the historical demand data may store the historical demand data in the matrix of size 252×24. In an embodiment "24" represents the count of hours in a day.

The demand prediction unit 208 may be further configured to receive location information pertaining to the plurality of existing replenishment stations from the database server 102. In an embodiment, the location information may correspond to coordinates associated with each of the plurality of existing replenishment stations. Following Table 1 illustrates an example of the plurality of existing replenishment stations:

TABLE 1

| Coordinates of plurality of existing replenishment station | Charge Units consumed per hour |
|---|---|
| A (35.244966, 101.85225) | 1365 |
| B (27.562471, −97.112148) | 738 |
| C (17.249945, 73.168945) | 659 |
| D (14.672881, 78.662109) | 862 |

A person skilled in the art will understand that the scope of the disclosure should not be limited to the example as illustrated in Table 1. Further, the examples provided in supra are for illustrative purposes and should not be construed to limit the scope of the disclosure.

In an embodiment, the demand prediction unit 208 may be configured to determine a first distance between each pair of the replenishment stations of the plurality of existing replenishment stations based on the coordinates associated with each of the plurality of existing replenishment stations and the map data. A person having ordinary skills in the art would understand that the distance between the pair of replenishment stations is determined based on the routes connecting the pair of replenishment stations. Further, the person having ordinary skills in the art would understand that the demand prediction unit 208 may utilize one or more know techniques (such as shortest path algorithm) to determine the distance between the pair of replenishment stations.

In an embodiment, after determining the distance between the pair of replenishment stations, the demand prediction unit 208 may create a second data structure, such as a matrix.

In an embodiment, the second data structure includes the replenishment demand of $j^{th}$ nearest replenishment station to the $i^{th}$ charging station multiplied by the distance between the $j^{th}$ replenishment station and the $i^{th}$ replenishment station. Following Table 2 illustrates an example second data structure:

TABLE 2

Illustrates second data structure

| Replenishment station (i) | Replenishment station (j) | | | |
|---|---|---|---|---|
| | Replenishment station - A | Replenishment station - B | Replenishment station - C | Replenishment station - D |
| Replenishment station - E | 1365 Charging Unit × 65 Miles | 738 Charging Unit × 60 Miles | 659 Charging Unit × 20 Miles | 862 Charging Unit × 5 Miles |

The demand prediction unit 208 may be configured to receive the traffic information stored in the database server 102. In an embodiment, the traffic information may include information about traffic speeds, traffic density, and travel times between the plurality of road intersections within the pre-defined area. In an alternate embodiment, the database server 102 is periodically updated based on the traffic information gathered/received from the one or more sensors installed at a plurality of road intersections. Examples of the one or more sensors comprise but are not limited to an accelerometer, a motion sensor, an infrared sensor, and the like. In an embodiment, a positioning system (e.g., a GPS system) in conjunction with one or more sensors may be utilized to determine the traffic information at the plurality of road intersections. In alternate embodiment, a GPS device and an accelerometer fitted inside each of a plurality of vehicles may be utilized to determine the traffic information based on the position of each of the plurality of vehicles, a time duration for which each of the plurality of vehicles is at the same position, and speed at which each of the plurality of vehicles are moving. In an embodiment, the traffic information may retrieved from the database server 102 in one or more data formats, such as an RSS or XML feed.

For example, Table 3 as illustrated below is an exemplary scenario that may correspond to the traffic information between the plurality of road intersections.

TABLE 3

| Traffic information between intersection names | Traffic speed (KM/HR) | Travel times (minutes) |
|---|---|---|
| Intersection A and Intersection B | 5 | 27 |
| Intersection X and Intersection Y | 60 | 5 |
| Intersection M and Intersection N | 30 | 18 |

A person skilled in the art will understand that the scope of the disclosure should not be limited to the example as illustrated in Table 3. Further, the examples provided in supra are for illustrative purposes and should not be construed to limit the scope of the disclosure.

In an embodiment, the demand prediction unit 208 may create a third data structure, such as a matrix, that includes the traffic information, such as traffic density, at $j^{th}$ traffic intersection multiplied by the distance between the $j^{th}$ traffic intersection and the $i^{th}$ replenishment station. Following Table 4 illustrates an example third data structure:

TABLE 4

Illustrates third data structure

| Replenishment station (i) | Traffic intersection (j) | | | |
|---|---|---|---|---|
| | Traffic intersection - A | Traffic intersection - B | Traffic intersection - C | Traffic intersection - D |
| Replenishment station - A | 500 vehicles × 65 Miles | 20 vehicles × 60 Miles | 30 Vehicles × 20 Miles | 80 vehicles × 5 Miles |

Further, in an embodiment, the demand prediction unit 208 may be configured to identify one or more point of interest locations in the predefined area based on a map data of the predefined area. In an embodiment, the one or more point of interest locations may be determined based on a number of visits by the one or more vehicles at each of the one or more point of interest locations. In an embodiment, the number of visits of the one or more vehicles at the one or more point of interest locations based on the parking information obtained from the authorities at the one or more point of interest locations. Some examples of a point of interest location may include a shop, a restaurant, a hospital, or a hotel. In an embodiment, each of the one or more point of interest locations have an address (e.g., street address) associated with them. In an embodiment, in the map data the street address associated with each of the one or more point of interest locations is represented as geographical coordinates. In an embodiment, the one or more point of interest locations are classified into one or more categories. In an embodiment, the one or more categories comprise sustenance, education, transportation, financial, healthcare, entertainment, sports, gardens, place of worships, shops, and public buildings.

Based on the location of the one or more point interest locations, the demand prediction unit 208 may be configured to create a fourth data structure. In an embodiment, the fourth data structure may include the information pertaining to a count of a set of point of interest locations of a particular category, within a predetermined radius from the replenishment station i. Following Table 5 illustrates an example fourth data structure:

TABLE 5

Illustrates fourth data structure

| Replenishment station (i) | Point of interest category j | | | |
|---|---|---|---|---|
| | Hospitals | Shopping malls | Restaurant | Garden |
| Replenishment station - A | 2 | 10 | 15 | 3 |

In an embodiment, after creation of the first data structure, the second data structure, the third data structure, and the fourth data structure, the demand prediction unit 208 may utilize canonical correlation analysis technique to create a first replenishment prediction model P1, a second replenishment prediction model P2, and a third replenishment prediction model P3. Following equations represent the replenishment prediction model P1, the second replenishment prediction model P2, and the third replenishment prediction model P3

$$P1 = P(Y|X1) \quad (1)$$

$$P2 = P(Y|X2) \quad (2)$$

$$P3 = P(Y|X3) \quad (3)$$

where,
P1: First replenishment model;
P2: Second replenishment model;
P3: Third replenishment model;
Y: First data structure;
X1: Second data structure;
X2: Third data structure; and
X3: Fourth data structure.

In an embodiment, during the creation of the first prediction model, the second prediction model, and the third prediction mode, the demand prediction unit 208 may determine a prediction error for each of the three prediction models. The determination of the prediction error has been described later in conjunction with FIG. 5. After determination of the prediction error for each of the three prediction models, the demand prediction unit 208 may be configured to assign weights to each of the three prediction models. Following equation is used to determine the prediction error for each of the three prediction models.

$$w_i = (1 - e_i / \Sigma_{i=1}^{r} e_i) \quad (4)$$

where,
$e_i$: Prediction error of the $i^{th}$ prediction model; and
r: Count of the number of prediction models.
Since the weights assigned to each of the first prediction demand, the second prediction demand, and the third prediction demand may not add to one hence the demand prediction unit 208 divides wi by $\Sigma_{i=1}^{r} w_i$.

After assignment of the weights to each of the first prediction model, the second prediction model, and the third prediction mode, the application server 108 may be configured to receive the one or more input parameters from the user-computing device 104. In an embodiment, the user may select one or more input parameters, such as the historical demand data, the one or more point of interest locations within the pre-defined area, and the traffic information. Further, the user may select a location on the map shown in the user-interface for which the user wants to predict the replenishment demand. In an embodiment, the location selected by the user may be depicted using an interactive marker. The user-computing device 104 may be configured to transmit location information (geographical coordinates) associated with the selected location. Based on the received location information and the one or more input parameters, the demand prediction unit 208 may be configured to determine the first demand prediction, the second demand prediction, and the third demand prediction.

In an embodiment, the weight denoted by wi may be learnt such that predictive performance of each of the first prediction demand, the second prediction demand, and the third prediction demand is maximized. In an embodiment, each of the first prediction demand, the second prediction demand, and the third prediction demand may be collectively referred as predictive distribution. Let p (Y|X1, ..., Xr)=p denote the predictive distribution (replenishment demand). In an embodiment, the replenishment demand at the selected location may be predicted based on an aggregation of the first demand prediction, the second demand prediction, and the third demand prediction. In an embodiment, the replenishment demand (p) may be predicted in accordance with the equation 5.

$$p = \Sigma_{i=1}^{r} w_i p_i \quad (5)$$

In an exemplary implementation, let $X_i \in R^{n_c \times n_{r_i}}$, where I=1 . . . r represent an external information source, such as the historical demand, the one or more point of interest locations, and the traffic information. In an embodiment, each of the external information source may correspond to an independent variable. Further let $Y \in R^{n_c \times n_{r_y}}$ represent the replenishment demand. In an embodiment, the replenishment demand may correspond to a dependent variable. In an embodiment, the latent variable model of CCA may be explained as:

$$z \sim N(0,1)$$

$$D^m \sim N(A^m z, \Psi^m), \, m=1,2$$

where $D^1 = X^i$ and $D^2 = Y$, and z is the latent variable that captures shared information between Xi and Y. Further, the demand prediction unit 208 may be configured to transform the latent variable model of CCA to observed space by linear mapping $A^m z$, where $A^m \in R^{n_{r_j} \times K}$, j={i,y} and K is the dimensionality of the latent variable. $\Psi^m$ is the generic covariance matrix that captures dataset specific information. Thus, based on a multiple regression technique implemented using CCA and the latent variable model of CCA, the demand prediction unit 208 may be configured to predict the replenishment demand in accordance with the equation 5.

A person skilled in the art will understand that the scope of the disclosure should not be limited to predicting the replenishment demand based on the aforementioned factors and using the aforementioned techniques. Further, the disclosure should not be limited to determining the replenishment demand for the selected location. In an embodiment, the user may select a plurality of locations for which the replenishment demand is to be predicted. Further, the examples provided in supra are for illustrative purposes and should not be construed to limit the scope of the disclosure.

A person skilled in the art will understand that the scope of the disclosure should not be limited to predicting the replenishment demand based on the first data structure (X1), the second data structure (X2), and the third data structure (X3). In an embodiment, each of the data structures represent one or more external factors based on which the replenishment demand may be predicted.

In an alternate embodiment, the demand prediction unit 208 may be configured to determine the replenishment demand for a plurality of locations that may be selected by the user via the user-interface. In an embodiment, the predicted replenishment demand comprises a number of charge units consumed per hour at each of the plurality of locations. In an embodiment, based on the predicted replenishment demand at the plurality of locations and a pre-defined threshold, the processor 202 may be configured to identify one or more locations from the plurality of locations for placement of the one or more replenishment stations for one or more vehicles. For example, the replenishment demand at location A, location B, and location C is 400, 500, and 900, respectively. The pre-defined threshold is 450. Then processor 202 may identify location B and location C for placement of the one or more replenishment stations for one or more vehicles. In an embodiment, the one or more vehicles may comprise a gasoline vehicle or an electric vehicle. Accordingly, the one or more replenishment stations may correspond to either a gasoline refueling station or an electric charging station.

In an alternate embodiment, after identifying the one or more locations from the plurality of locations for placement of the one or more replenishment stations for the one or more vehicles, the transceiver may transmit information (e.g., location information) pertaining to the identified one or more locations to the user-computing device 104. Based on the received information by the user-computing device 104, the user interface is displayed on the user-computing device 104 that includes a map. In an embodiment, one or more user interactive markers, corresponding to the identified one or more locations, may be displayed on the map. In response to the display of the one or more user interactive markers, an input may be received from a user of the user-computing device 104 on the one or more user interactive markers. In response to the input, the replenishment demand at the identified location may be displayed on a display screen of the user-computing device 104 in a form of one or more graphical representations comprising a bar chart, a pie chart, a heat map, and/or a line chart. The user-interface displayed on the display screen on the user-computing device 104 is explained later in conjunction with FIG. 4.

A person skilled in the art will understand that the scope of the disclosure should not be limited to identifying one or more locations for placement of one or more replenishment stations for one or more vehicles based on the aforementioned factors and using the aforementioned techniques. Further, the examples provided in supra are for illustrative purposes and should not be construed to limit the scope of the disclosure.

Figure 3:
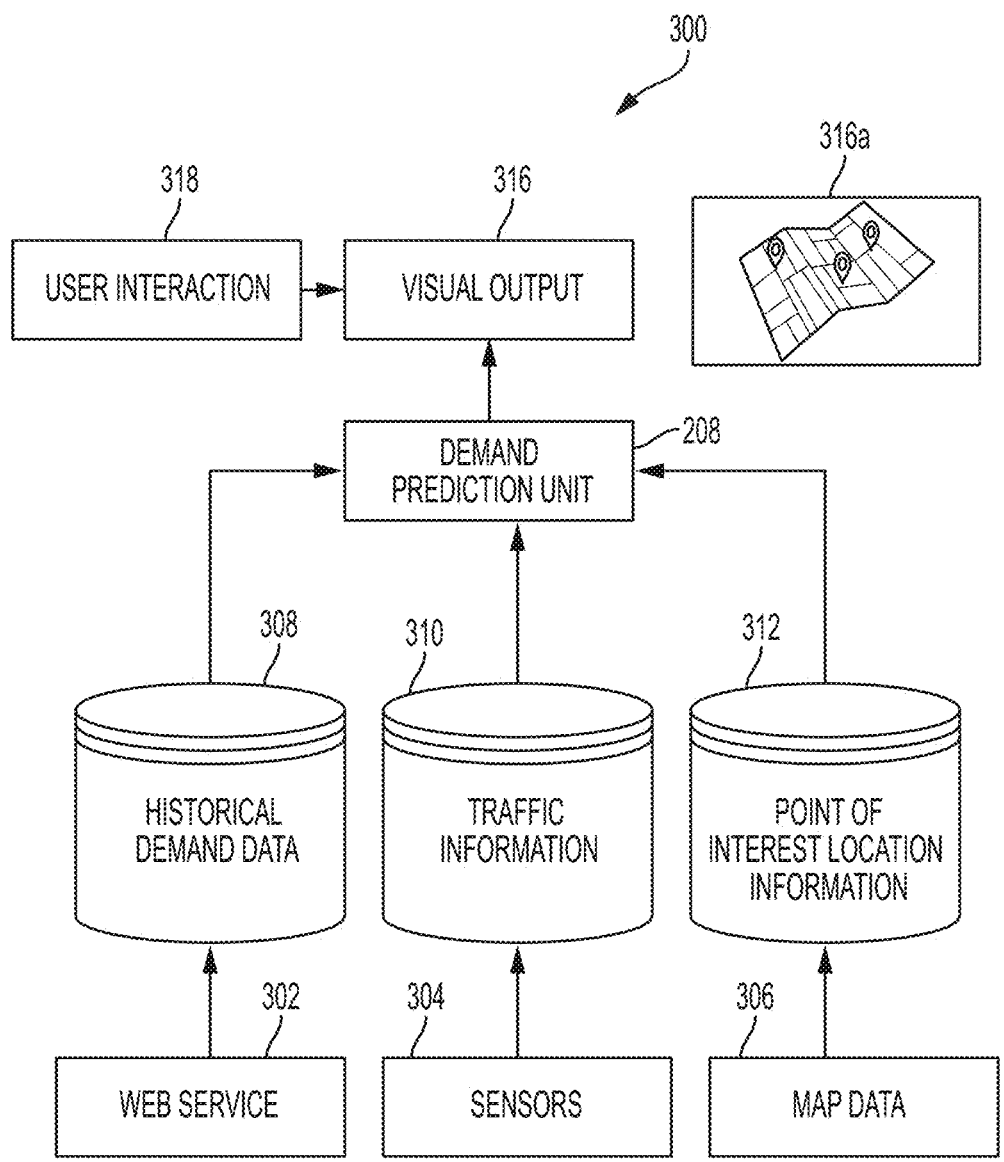
FIG. 3 is a block diagram that illustrates an exemplary scenario to identify one or more locations for placement of one or more replenishment stations for one or more vehicles in accordance with at least one embodiment.

FIG. 3 is a block diagram that illustrates an exemplary scenario 300 to identify the one or more locations for placement of one or more electric vehicle charging stations for the one or more electric vehicles in accordance with at least one embodiment. The FIG. 3 is described in conjunction with FIG. 1 and FIG. 2.

In an implementation of the exemplary scenario, the user may provide one or more input parameters via the user-computing device 104 to the application server 108. In an embodiment, the user may select one or more input parameters, such as the historical demand data, the one or more point of interest locations within the pre-defined area, and the traffic information. The user may select a plurality of locations on the map for which the electric vehicle charging demand (replenishment demand) is to be predicted. For the sake of implementation of the exemplary scenario, let us consider that the user has selected all the 3 one or more input parameters. In addition, the user may provide information pertaining to the pre-defined area, and a time interval for which the electric vehicle charging demand at the plurality of locations is to be predicted. Let us consider the number of locations for which the electric vehicle charging demand to be predicted is five.

After selection of the one or more input parameters, with reference to FIG. 3, the block 308 represents the historical demand data that may be received via a web service 302 associated with each of the one or more electric vehicle charging stations. The historical demand data comprises information pertaining to the hour wise electricity consumption at each of the one or more electric vehicle charging stations. In an embodiment, the historical demand data may be received from the database server 102. Based on the historical demand data the demand prediction unit 208 may be configured to determine the first data structure (Y). An example of the first data structure is shown in Table 1.

For each of the selected plurality of locations at which the user wants to predict the electric vehicle charging demand, the demand prediction unit 208 may be configured to extract the historical demand data for j nearest electric vehicle charging stations. Let us consider j=5. Thus, historical demand data for the five nearest replenishment stations is extracted from the historical demand data 308. Further, the first distance between each of the selected plurality of locations and the five nearest electric vehicle charging stations is calculated. Based on the determined information, the demand prediction unit 208 may be configured to determine the second data structure (X1). An example of the second data structure is shown in Table 2.

Further, the traffic information 310 between the plurality of road intersections may be obtained from the one or more sensors 304. In an embodiment, the traffic information 310 may refer to information about traffic speeds, traffic density, and travel times between the plurality of road intersections within the pre-defined area. In an embodiment, a positioning system (e.g., a GPS system) in conjunction with one or more sensors 304 may be utilized to determine the traffic information 310. In an embodiment, a GPS device and an accelerometer fitted inside each of a plurality of vehicles is utilized to determine the traffic information 310. Based on the received traffic information 310, the demand prediction unit 208 may be configured to determine traffic at 'j' nearest traffic intersections. Consider j=5. Thus, the traffic information 310 associated with 5 nearest traffic intersections of each of the selected plurality of locations is determined. Further, the distance between each of the five traffic intersections from the each of the selected plurality of locations is determined. Based on this information, the demand prediction unit 208 may be configured to determine the third data structure (X2). An example of the third data structure is shown in Table 3.

Further, point of interest location information 312 may be determined by the processor 202 to identify one or more point of interest locations based on the map data 306. In an embodiment the map data may comprise of coordinates of the one or more point of interest locations. Further, the demand prediction unit 208 may be configured to determine the count of a set of point of interest locations of a particular category, within a predetermined radius from each of the selected plurality of locations. Let us consider the predetermined radius around each location is 5 miles. Based on count, the demand prediction unit 208 may be configured to determine the fourth data structure (X3). An example of the fourth data structure is shown in Table 4.

The demand prediction unit 208 is provided the first data structure (Y), the second data structure (X1), the third data structure (X2), the fourth data structure (X3) as input for implementing CCA on the first replenishment prediction model P1, the second replenishment prediction model P2, and the third replenishment prediction model P3. Based on the equation 1, equation 2, and equation 3, and the weights assigned to each prediction model, the demand prediction unit 208 may be configured to determine the first prediction demand (p1), the second prediction demand (p2), and the third prediction demand (p3) as described in FIG. 2. Based on the first demand prediction, the second demand prediction, and the third demand prediction, the demand prediction unit 208 may be configured to determine the electric vehicle charging demand at the plurality of locations in accordance with equation 5.

After determining the electric vehicle charging demand at the plurality of locations, the application server 108 may receive an input corresponding to a pre-defined threshold that is indicative of a minimum electric vehicle charging demand at each of the selected plurality of locations. Based on the pre-defined threshold, the demand prediction unit 208 may be configured to select one or more locations from the plurality of locations for placement of the one or more electric vehicle charging stations.

In an embodiment, the demand prediction unit 208 provides a visual output 316 that corresponds to a map which includes one or more user interactive markers. In an embodiment, the one or more user interactive markers correspond to the identified one or more locations at which the electric vehicle charging stations may be placed. After the visual output 316 is displayed to the user on the user-computing device 104, a user interaction may be received on the one or more user interactive markers. For example, the user may click on a user interactive marker to view the electric vehicle charging demand at the location represented by the user interactive marker. In an embodiment, the electric vehicle charging demand comprises a number of charge units consumed per hour at the location represented by the user interactive marker. In an embodiment, when the user interaction is received on the one or more user interactive markers, the electric vehicle charging demand may be displayed in the form of one or more graphical representations comprising a bar chart, a pie chart, a heat map, and/or a line chart. The user-interface displayed on the display screen on the user-computing device 104 is explained later in conjunction with FIG. 4.

A person skilled in the art will understand that the scope of the disclosure should not be limited to predicting the electric vehicle charging demand at a plurality of locations and identifying the one or more locations for placement of the electric vehicle charging stations based on the aforementioned factors and using the aforementioned techniques. Further, the examples provided in supra are for illustrative purposes and should not be construed to limit the scope of the disclosure.

Figure 4:
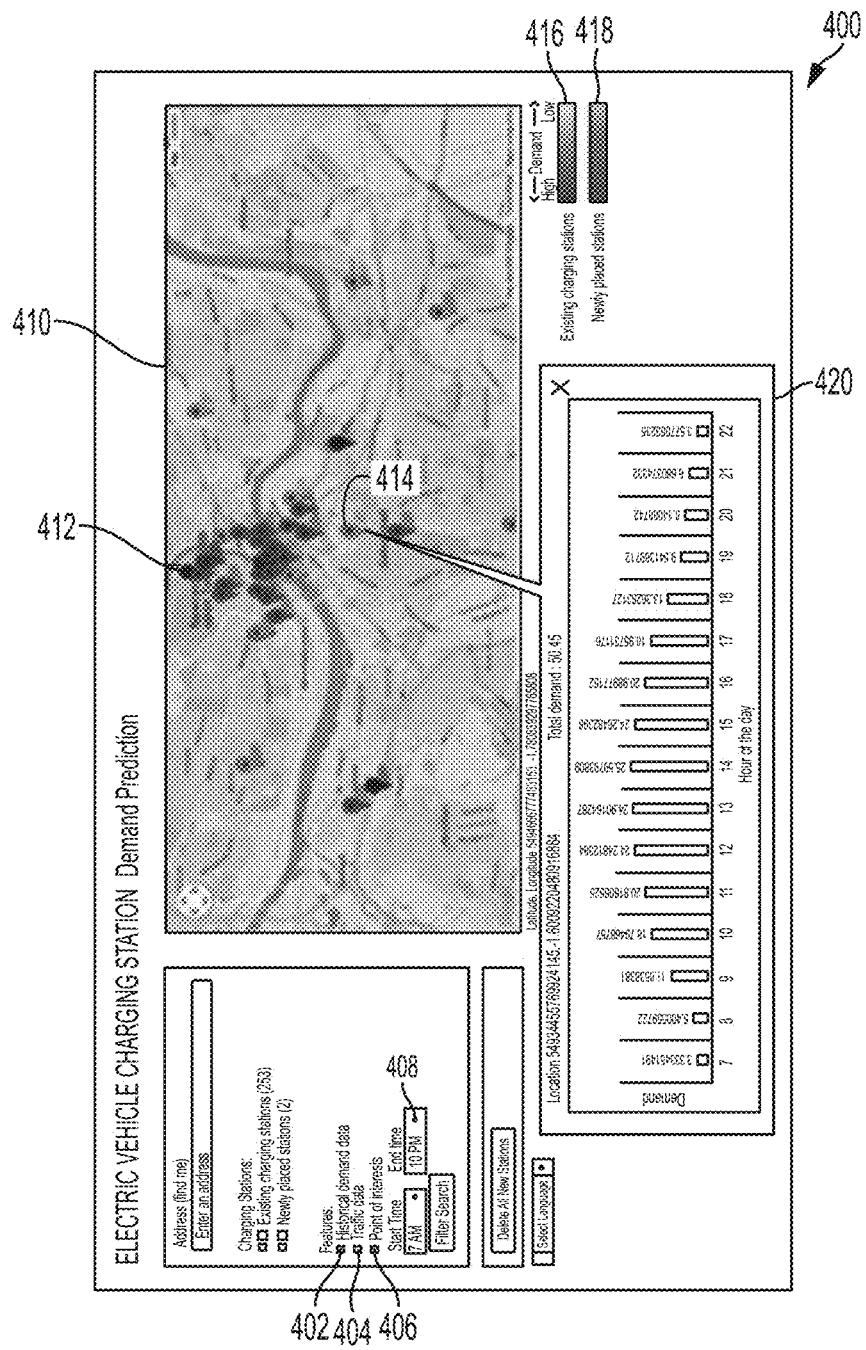
FIG. 4 illustrates an example user-interface presented on a user-computing device in accordance with at least one embodiment.

FIG. 4 illustrates an example user-interface 400 presented on a user-computing device in accordance with at least one embodiment. The FIG. 4 is described in conjunction with FIG. 1 and FIG. 2.

The user-interface 400 illustrates one or more check boxes 402, 404, and 406 that may be utilized by the user to provide the one or more input parameters. In an embodiment 402 corresponds to the historical demand data, 404 corresponds to the traffic information, and 406 corresponds to the one or more point of interest locations. IN an embodiment, the user may select one or more of 402, 404, and 406 as the one or more input parameters.

The user may further provide pre-defined time interval by utilizing the user interface element denoted by 408. The user interface element 408 may be utilized by the user to provide a start time and an end time between which the replenishment demand is to be predicted. After receiving the one or more input parameters via the user interface, a map denoted by 410 is displayed. One or more user interactive markers denoted by 412 and 414 may be displayed on the map 410. The user interface elements denoted by 412 and 414 may correspond to one or more user interactive markers that are representative of an existing replenishment station and a newly identified location for placement of a replenishment station, respectively. In an embodiment, different colors may be utilized to distinguish between the existing and newly identified replenishment stations. For example, existing replenishment stations may be represented by blue color and the newly identified locations for placement of the replenishment stations may be represented using green color.

In an embodiment, the color of each of each of the one or more user interactive markers may have a varying gradient. The varying gradient of the color is indicative of the replenishment demand at the associated replenishment station. For example, if the color gradient is dark then it indicates that the replenishment demand at the associated replenishment station is high. Similarly, if the color gradient is light then it indicates that the replenishment demand at the associated replenishment station is low. In an embodiment, the user interface element 416 displays the gradient showing the replenishment demand at the plurality of existing replenishment stations. Similarly, the user interface element 418 displays the gradient showing the replenishment demand at each of the identified one or more locations.

In an embodiment, when the user performs an input operation, such as a mouse click on the one or more user interactive markers, then the one or more graphical representations 420, such as a bar chart, a pie chart, a heat map, and/or a line chart may be displayed. In an embodiment, the one or more graphical representations 420 displays the hour wise replenishment demand at the location represented by the one or more user interactive markers. Additionally, the location details of the identified location represented by the user interactive marker may be displayed when the user performs a pre-defined user input on the user interactive marker.

A person skilled in the art will understand that the user-interface 400 is described herein for illustrative purposes and should not be construed to limit the scope of the disclosure.

Figure 5:
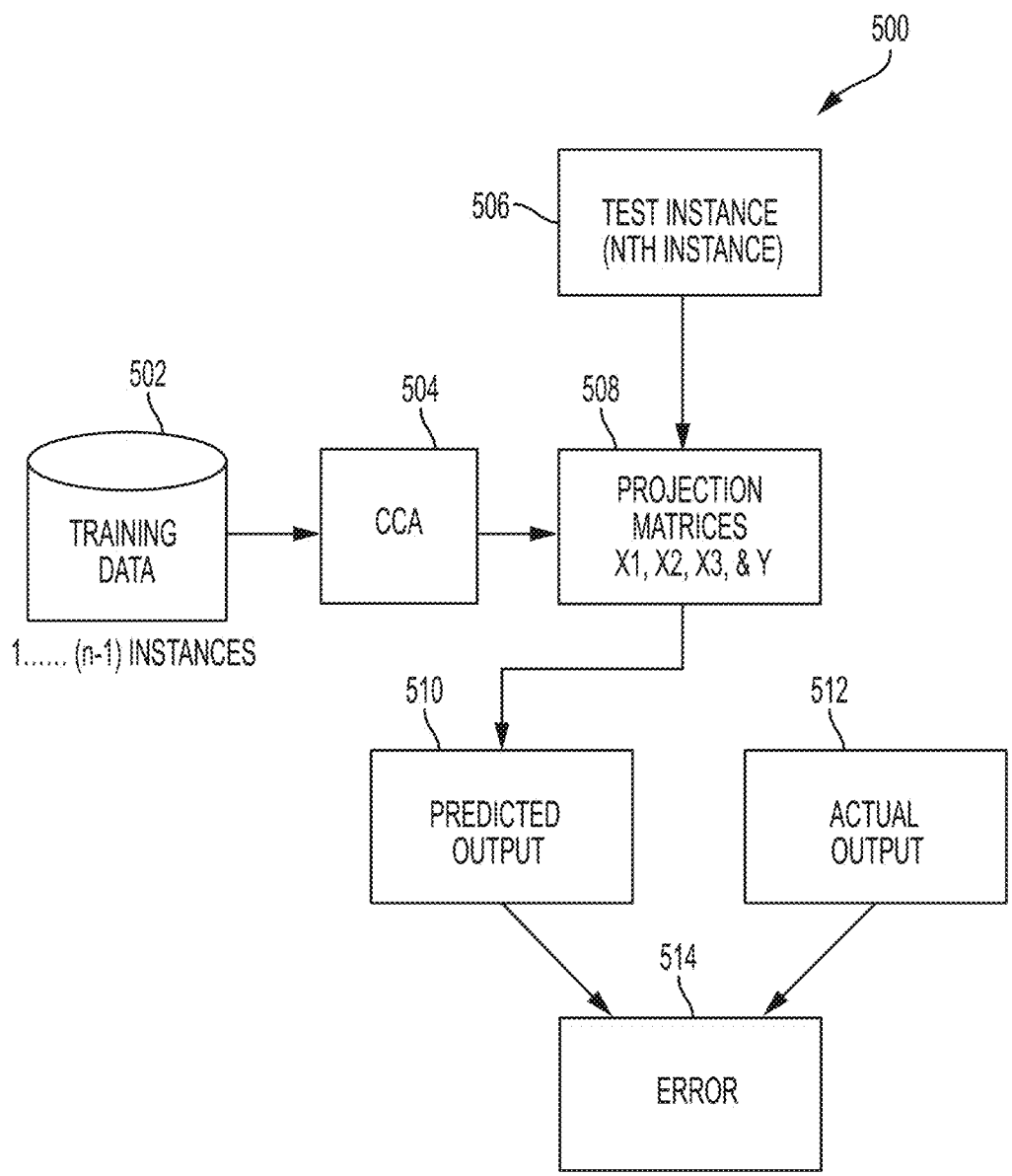
FIG. 5 is a block diagram that illustrates usage of training data to predict a replenishment demand at a plurality of locations within a pre-defined area.

FIG. 5 is a block diagram 500 that illustrates usage of training data to predict the replenishment demand at the plurality of locations within the pre-defined area. The FIG. 5 is described in conjunction with FIG. 1 and FIG. 2.

A training data set comprises of a plurality of instances for which the associated outcome is already known. However, in order to train the demand prediction unit 208 to predict the one or more locations for placement of one or more replenishment stations for one or more vehicles, the demand prediction unit 208 is trained using the training data set and a test data set.

Let the total number of training instances available for training be 'N'. In an embodiment, leave one out evaluation method may be utilized for training. In such a method for training, N−1 training instances are used as training data and the remaining one left out instance is used as a test instance. The method is repeated for by leaving out each test instance once. Further, the predicted output associated with each of the test instances is compared with the actual output that is available in the training data set. Based on the comparison, of the predicted output and the actual output, an error is determined after each training cycle. The errors obtained for each of the N instances are determined and an average error value is determined. In an embodiment, a Root Mean Square Error (RSME) is determined based on the errors obtained for each of the N instances and these errors are utilized to train the demand prediction unit 208 in such a manner that the predicted output and the actual output are equivalent.

With reference to FIG. 5, block 502 denotes the training data that comprise the total number of training instances (N instances) available for training. Based on the leave one out evaluation method, N−1 instances are considered as a part of block 502 and the remaining one instance (Nth instance) is considered as a test instance 506. The N−1 instances are provided as input to demand prediction unit 208 to implement CCA denoted by 504 and determine the projection matrices 508. Further, the data available in the test instance 506 is provided as input to the projection matrices (X1, X2, X3, and Y) 508. Thus, based on the input, the replenishment demand (predicted output) at the the test instance is predicted. The predicted output is denoted with numeral 510.

After the replenishment demand for the test instance is predicted then the predicted output 510 is compared with the actual output denoted by 512 that is available in the training data set. Based on the comparison the error denoted by 514 may be utilized to train the first replenishment prediction model, the second replenishment prediction model, and the third replenishment prediction model.

After the training of the demand prediction unit 208 is complete based on the training data set, then the demand prediction unit 208 may be utilized to predict the replenishment demand at a plurality of locations within the pre-defined area. Additionally, in an embodiment, the demand prediction unit 208 may identify the one or more locations from the plurality of locations for placement of the one or more replenishment stations based on the predicted replenishment demand at the plurality of locations and the pre-defined threshold.

A person skilled in the art will understand that the usage of training data to predict the replenishment demand at the plurality of locations within the pre-defined area is described herein for illustrative purposes and should not be construed to limit the scope of the disclosure.

Figure 6A:
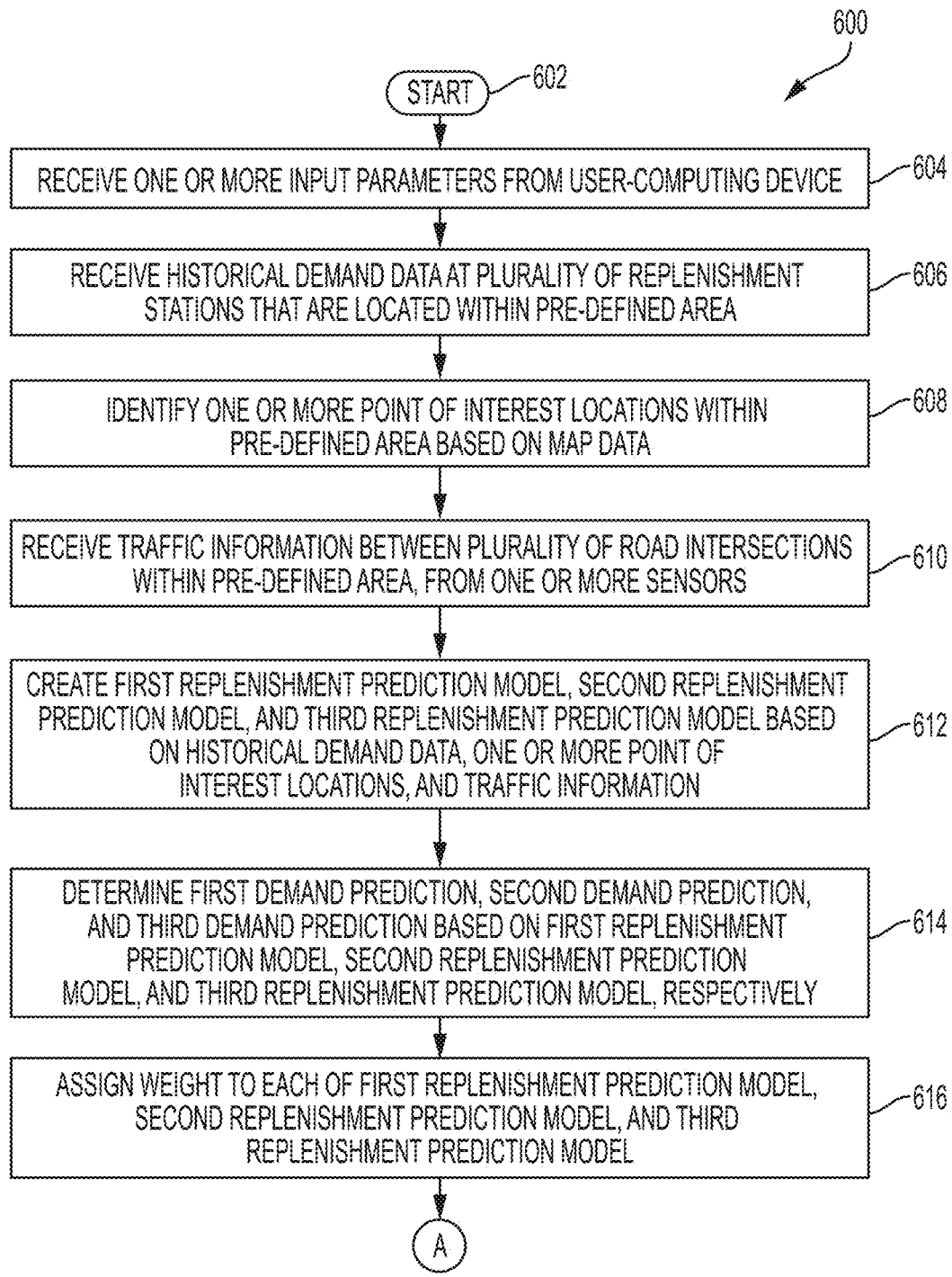
FIGS. 6A and 6B is a flowchart that illustrates a method to identify one or more locations for placement of one or more replenishment stations for one or more vehicles in accordance with at least one embodiment.
Figure 6B:
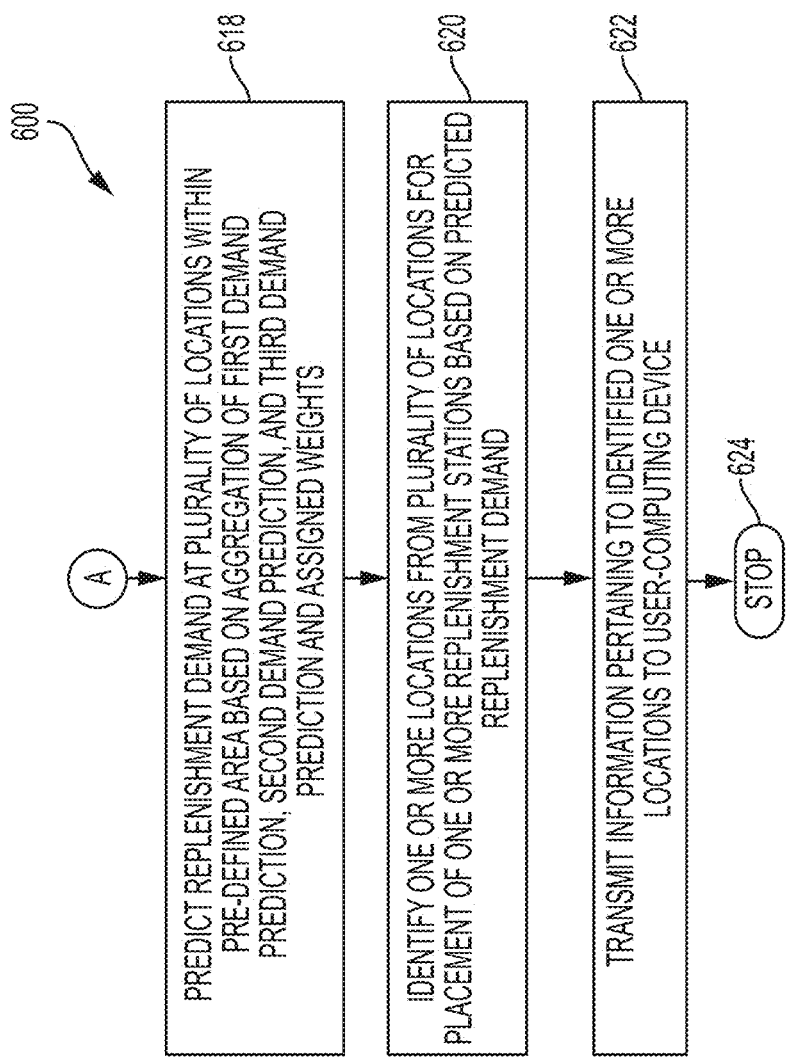

FIGS. 6A and 6B is a flowchart that illustrates a method to identify one or more locations for placement of one or more replenishment stations for one or more vehicles in accordance with at least one embodiment. The FIG. 6 is described in conjunction with FIG. 1 and FIG. 2.

The method starts at step 602 and proceeds to step 604. At step 604, the application server 108 may receive one or more input parameters from the user-computing device. In an embodiment, the one or more input parameters may comprise the pre-defined area, the information pertaining to the plurality of locations, and a time interval for which the replenishment demand at the plurality of locations is to be predicted. At step 606, the application server 108 may receive the historical demand data at the plurality of replenishment stations that are located within the pre-defined area. At step 608, the application server 108 may identify one or more point of interest locations within the pre-defined area based on the map data. At step 610, the application server 108 may receive traffic information between a plurality of road intersections within the pre-defined area, from one or more sensors.

At step 612, the application server 108 may create the first replenishment prediction model, the second replenishment prediction model, and the third replenishment prediction model based on the historical demand data, the one or more point of interest locations, and the traffic information. At step 614, the application server 108 may determine the first demand prediction, the second demand prediction, and the third demand prediction based on the first replenishment prediction model, the second replenishment prediction model, and the third replenishment prediction model, respectively. At step 616, the application server 108 may assign a weight to each of the first demand prediction, the second demand prediction, and the third demand prediction.

At step 618, the application server 108 may predict a replenishment demand at a plurality of locations within the pre-defined area based on an aggregation of the first demand prediction, the second demand prediction, and the third demand prediction. At step 620, the application server 108 may identify one or more locations from the plurality of locations for placement of one or more replenishment stations based on the predicted replenishment demand at the plurality of locations and a pre-defined threshold. At step 622, the application server 108 may transmit information pertaining to the identified one or more locations to a user-computing device. Control passes to end step 624.

In another implementation of the disclosed method and the system, the user may be displayed the map on the user-computing device 104 and one or more user interactive markers may be displayed on the map that represent the plurality of existing replenishment stations. In an embodiment, a color may be associated with each of the one or more user interactive markers. In an embodiment, the color may be utilized to distinguish between an existing replenishment station and a newly placed replenishment station. Further, varying gradient may be present in the color that is used to denote the one or more user interactive markers. In an embodiment, high intensity of the color denotes a high demand at the corresponding replenishment station.

Further, the user may select one or more input parameters, such as the traffic information, one or more point of interest locations, and a pre-defined time interval. After selection of the one or more input parameters, the user may click on a location within the map where the user may want to place a new replenishment station. In response to the click event on the map, a user interactive marker with a particular color (e.g., red) may be displayed on the map. The demand prediction unit 208 may be configured to predict the replenishment demand at the location where the user has performed the click event. In an embodiment, the technique described in conjunction with FIG. 2 may be utilized to determine the replenishment demand at the location.

In an embodiment, the user may click on one or more locations within the map and the replenishment demand associated with each of the one or more locations where the new replenishment stations may be placed is predicted by the demand prediction unit 208. In an embodiment, when the user hovers over the one or more newly placed user interactive markers, the replenishment demand may be displayed. Additionally, location information associated with the one or more newly placed user interactive markers may be displayed to the user. In an embodiment, a count of the newly placed replenishment stations may be displayed to the user via a user-interface element in the user interface. In an embodiment, the user may be enabled to delete the one or more newly placed replenishment stations by utilizing a delete button that may be displayed on the user-interface.

Various embodiments of the disclosure provide a non-transitory computer readable medium and/or storage medium, and/or a non-transitory machine-readable medium and/or storage medium having stored thereon, a machine code and/or a computer program having at least one code section executable by a machine and/or a computer to identify one or more locations for placement of one or more replenishment stations for one or more vehicles. The at least one code section in an application server 108 causes the machine and/or computer comprising one or more processors to perform the steps, which comprises receiving, by one or more processors, a historical demand data at a plurality of replenishment stations that are located within a pre-defined area. The one or more processors may identify one or more point of interest locations within the pre-defined area based on a map data. The one or more processors may receive traffic information between a plurality of road intersections within the pre-defined area, from one or more sensors. The one or more processors may determine a first demand prediction, a second demand prediction, and a third demand prediction based on a combination of the historical demand data and a first latent variable, the one or more point of interest locations and a second latent variable, and the traffic information and a third latent variable, respectively. The one or more processors may predict a replenishment demand at a plurality of locations within the pre-defined area based on an aggregation of the first demand prediction, the second demand prediction, and the third demand prediction. The one or more processors may identify one or more locations from the plurality of locations for placement of one or more replenishment stations based on the predicted replenishment demand at the plurality of locations and a pre-defined threshold.

Various embodiments of the disclosure encompass numerous advantages including method and system for identifying one or more locations for placement of one or more replenishment stations for one or more vehicles. In an embodiment, the method and system may be utilized for selection and evaluation of potential locations to place electric vehicle charging stations, using the multiple dependent regression technique implemented using CCA. In an embodiment, the method and the system combine heterogeneous data sources by modeling statistical dependence among them to predict electric charging demand at the plurality of locations. The method and system provides a decision support system for building a better electric vehicle charging infrastructure and thereby reduces the risk of placement of a new electric charging station in a location where it would be under-utilized.

The present disclosure may be realized in hardware, or in a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skill in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like. The claims can encompass embodiments for hardware and software, or a combination thereof.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What is claimed is:

1. A method for identifying and displaying on a graphical user-interface one or more locations for placement of one or more replenishment stations for one or more vehicles, the method comprising:
   receiving, by one or more processors, a historical demand data at a plurality of existing replenishment stations within a pre-defined area;
   identifying, by the one or more processors, one or more point of interest locations within the pre-defined area based on a map data;
   receiving, by the one or more processors, traffic information between a plurality of road intersections within the pre-defined area, from one or more sensors;
   for each existing replenishment station of the plurality of existing replenishment stations, determining, by the one or more processors:
      first distances to each of the existing replenishment stations,
      second distances to each road intersection within the pre-defined area, and
      a count of the one or more point of interest locations within a predetermined radius of the existing replenishment station;
   creating, by the one or more processors:
      a first replenishment prediction model based the historical demand data and the determined first distances,
      a second replenishment prediction model based the historical demand data, traffic information between a plurality of road intersections within the pre-defined area, and the second distances, and
      a third replenishment prediction model based on the historical demand data and the determined count of the one or more point of interest locations;
   instructing, by one or more processors, the graphical user-interface to display a map of the pre-defined area;
   receiving, by one or more processors, one or more user-selected locations within the pre-defined area;
   determining, by the one or more processors, a first demand prediction, a second demand prediction, and a third demand prediction based on the first replenishment prediction model, the second replenishment prediction model, and the third replenishment prediction model, respectively, and the received one or more user-selected locations;
   predicting, by the one or more processors, a replenishment demand at the one or more user-selected locations within the pre-defined area based on an aggregation of the first demand prediction, the second demand prediction, and the third demand prediction; and
   identifying on the graphical user-interface, by the one or more processors, the one or more locations from the one or more user-selected locations for placement of the one or more replenishment stations based on the predicted replenishment demand at the one or more user-selected locations and a pre-defined threshold.

2. The method of claim 1, further comprising transmitting, by the one or more processors, information pertaining to the identified one or more locations to a user-computing device.

3. The method of claim 2, wherein the graphical user-interface is displayed on the user-computing device that includes a map, wherein one or more user interactive markers, corresponding to the one or more locations, are displayed on the map based on the transmitted information.

4. The method of claim 3, wherein an input is received from a user of the user-computing device on the one or more user interactive markers.

5. The method of claim 2, wherein the replenishment demand is displayed on a display screen of the user-computing device in a form of one or more graphical representations comprising a bar chart, a pie chart, a heat map, and/or a line chart.

6. The method of claim 1, wherein the first replenishment prediction model, the second replenishment prediction model, and the third replenishment prediction model are created based on a canonical correlation analysis (CCA) technique.

7. The method of claim 1, further comprising assigning, by the one or more processors, a weight to each of the first replenishment prediction model, the second replenishment prediction model, and the third replenishment prediction model, wherein the weight is indicative of an importance of each of the first replenishment prediction model, the second replenishment prediction model, and the third replenishment prediction model in predicting the replenishment demand.

8. The method of claim 1, wherein the map data comprises coordinates of the one or more point of interest locations, wherein the one or more point of interest locations are classified into one or more categories, wherein the one or more categories comprise sustenance, education, transportation, financial, healthcare, entertainment, sports, gardens, place of worships, shops, and public buildings.

9. The method of claim 1, wherein the replenishment stations correspond to a gas station or an electric vehicle charging station.

10. The method of claim 1, wherein the one or more vehicles comprises a gasoline vehicle or an electric vehicle.

11. The method of claim 1, wherein the historical demand data is received via a web service associated with each of the one or more replenishment stations.

12. The method of claim 1, wherein the replenishment demand comprises a number of charge units consumed per hour at the one or more locations.

13. An application server to identify and display via a graphical user-interface one or more locations for placement of one or more replenishment stations for one or more vehicles, the application server comprising:
one or more processors configured to:
receive a historical demand data at a plurality of existing replenishment stations that are located within a pre-defined area;
identify one or more point of interest locations within the pre-defined area based on a map data;
receive traffic information between a plurality of road intersections within the pre-defined area, from one or more sensors;
for each existing replenishment station of the plurality of existing replenishment stations, determine:
first distances to each of the existing replenishment stations,
second distances to each road intersection within the pre-defined area, and
a count of the one or more point of interest locations within a predetermined radius of the existing replenishment station;
create:
a first replenishment prediction model based the historical demand data and the determined first distances,
a second replenishment prediction model based the historical demand data, traffic information between a plurality of road intersections within the pre-defined area, and the second distances, and
a third replenishment prediction model based on the historical demand data and the determined count of the one or more point of interest locations;
instruct the graphical user-interface to display a map of the pre-defined area;
receive one or more user-selected locations within the pre-defined area;
determine a first demand prediction, a second demand prediction, and a third demand prediction based on the first replenishment prediction model, the second replenishment prediction model, and the third replenishment prediction model, respectively, and the received one or more user-selected locations;
predict a replenishment demand at the one or more user-selected locations within the pre-defined area based on an aggregation of the first demand prediction, the second demand prediction, and the third demand prediction; and
identify on the graphical user-interface the one or more locations from the one or more user-selected locations for placement of the one or more replenishment stations based on the predicted replenishment demand at the one or more user-selected locations and a pre-defined threshold.

14. The application server of claim 13, wherein the one or more processors are further configured to transmit information pertaining to the identified one or more locations to a user-computing device.

15. The application server of claim 14, wherein the one or more processors are further configured to receive one or more input parameters from the user-computing device, wherein the one or more input parameters comprise the pre-defined area, the information pertaining to the one or more locations, and a time interval for which the replenishment demand at the one or more locations is predicted.

16. The application server of claim 14, wherein the graphical user-interface is displayed on the user-computing device that includes a map, wherein one or more user interactive markers, corresponding to the one or more locations, are displayed on the map based on the transmitted information.

17. The application server of claim 13, the first replenishment prediction model, the second replenishment prediction model, and the third replenishment prediction model are created based on a canonical correlation analysis (CCA) technique.

18. The application server of claim 13, wherein the one or more point of interest locations are determined based on a number of visits by the one or more vehicles at each of the one or more point of interest locations.

19. A non-transitory computer-readable storage medium having stored thereon, a set of computer-executable instructions for causing a computer comprising one or more processors to perform steps comprising:
receiving, by one or more processors, a historical demand data at a plurality of existing replenishment stations that are located within a pre-defined area;
identifying, by the one or more processors, one or more point of interest locations within the pre-defined area based on a map data;
receiving, by the one or more processors, traffic information between a plurality of road intersections within the pre-defined area, from one or more sensors;

for each existing replenishment station of the plurality of existing replenishment stations, determining, by the one or more processors:
 first distances to each of the existing replenishment stations,
 second distances to each road intersection within the pre-defined area, and
 a count of the one or more point of interest locations within a predetermined radius of the existing replenishment station;
creating:
 a first replenishment prediction model based the historical demand data and the determined first distances,
 a second replenishment prediction model based the historical demand data, traffic information between a plurality of road intersections within the pre-defined area, and the second distances, and
 a third replenishment prediction model based on the historical demand data and the determined count of the one or more point of interest locations;
instructing, by one or more processors, a graphical user-interface to display a map of the pre-defined area;
receiving, by one or more processors, one or more user-selected locations within the pre-defined area;
determining, by the one or more processors, a first demand prediction, a second demand prediction, and a third demand prediction based on the first replenishment prediction model, the second replenishment prediction model, and the third replenishment prediction model, respectively, and the received one or more user-selected locations;
predicting, by the one or more processors, a replenishment demand at the one or more user-selected of locations within the pre-defined area based on an aggregation of the first demand prediction, the second demand prediction, and the third demand prediction; and
identifying on the graphical user-interface, by the one or more processors, one or more locations from the one or more user-selected of locations for placement of one or more replenishment stations based on the predicted replenishment demand at the one or more user-selected of locations and a pre-defined threshold.

* * * * *